US007829869B2

(12) United States Patent
Schützmann et al.

(10) Patent No.: US 7,829,869 B2
(45) Date of Patent: Nov. 9, 2010

(54) METHOD AND APPARATUS FOR CHECKING DOCUMENTS OF VALUE

(75) Inventors: Jürgen Schützmann, Pfaffenhofen (DE); Hendrik Derks, Geretsried (DE)

(73) Assignee: Giesecke & Devrient GmbH, Munich (DE)

( * ) Notice: Subject to any disclaimer, the term of this patent is extended or adjusted under 35 U.S.C. 154(b) by 107 days.

(21) Appl. No.: 12/234,802

(22) Filed: Sep. 22, 2008

(65) Prior Publication Data

US 2009/0078886 A1    Mar. 26, 2009

(30) Foreign Application Priority Data

Sep. 20, 2007 (DE) ....................... 10 2007 044 878

(51) Int. Cl.
*G01N 21/64* (2006.01)

(52) U.S. Cl. ................................................... 250/459.1

(58) Field of Classification Search .............. 250/459.1, 250/461.1, 458.1, 451.1
See application file for complete search history.

(56) References Cited

U.S. PATENT DOCUMENTS

| | | | | |
|---|---|---|---|---|
| 4,150,295 | A | 4/1979 | Wieder | |
| 6,024,202 | A * | 2/2000 | Potter | 194/207 |
| 6,035,914 | A | 3/2000 | Ramsey | |
| 6,297,509 | B1 | 10/2001 | Lipkowitsch et al. | |
| 7,170,074 | B2 | 1/2007 | Baudat | |
| 2003/0146394 | A1* | 8/2003 | Prange et al. | 250/458.1 |
| 2004/0031931 | A1* | 2/2004 | Muller et al. | 250/458.1 |
| 2005/0217969 | A1* | 10/2005 | Coombs et al. | 194/206 |
| 2007/0145293 | A1* | 6/2007 | Roth | 250/458.1 |

FOREIGN PATENT DOCUMENTS

| | | | |
|---|---|---|---|
| GB | 2 366 371 | A | 3/2002 |
| WO | 99/09382 | A1 | 2/1999 |

OTHER PUBLICATIONS

Sutherland et al., "Simultaneous measurement of fluorescence and phosphorescence using synchronously gated photon counters," 1979, Analytical Biochemistry, pp. 158-165. Abstract only.*

* cited by examiner

*Primary Examiner*—David P Porta
*Assistant Examiner*—Kiho Kim
(74) *Attorney, Agent, or Firm*—Bacon & Thomas, PLLC

(57) ABSTRACT

The invention relates to a method and an apparatus for recognizing forged documents of value, wherein the documents of value are illuminated with clocked excitation light of a light source. Within the bright phase of the excitation light a first luminescence intensity is detected, within the dark phase a second luminescence intensity. Because of the afterglow of the light pulses there is a residual fluorescence, which distorts the luminescence intensity in the dark phase. By linking the second luminescence intensity with the first luminescence intensity, e.g. by subtracting a scaled first luminescence intensity, a corrected second luminescence intensity is determined, which substantially corresponds to the phosphorescence signal of the document of value.

13 Claims, 3 Drawing Sheets

METHOD AND APPARATUS FOR CHECKING DOCUMENTS OF VALUE

FIELD OF THE INVENTION

The invention relates to a method for checking documents of value, in particular for recognizing forged documents of value, and an apparatus for carrying out the method.

BACKGROUND

From the prior art there are known various methods for recognizing forged documents of value. For checking the authenticity of documents of value, in particular of bank notes, these can be checked as to their luminescence properties. The term luminescence is understood to be the generic term for the radiation which the document of value emits back upon optical excitation. This means that both fluorescence intensity and phosphorescence intensity can contribute to the luminescence intensity. For detecting the fluorescence signal and phosphorescence signal, these signals are detected e.g. timewise one after the other, the fluorescence signal during the illumination with an excitation light pulse, the phosphorescence signal after the end of the excitation light pulse in the dark phase between two excitation light poses. When using UV lamps, the light pulses of which do not end abruptly but have an afterglow, at the time the phosphorescence signal is measured there still remains a certain residuary intensity of the excitation light, which is due to the afterglow of the UV lamp. With this remaining excitation light fluorescent substances, which are present in a document of value, can be excited to form a residual fluorescence. The residual fluorescence emitted by the fluorescent substances contributes to a luminescence signal detected in the dark phase, so that the phosphorescence measurement in the dark phase is distorted.

For distinguishing authentic documents of value from forgeries e.g. there is checked whether the intensity of the phosphorescence signal of an examined document of value exceeds a certain threshold value, since many forgeries exclusively show fluorescence, but no phosphorescence. To recognize forgeries as such, the threshold value is set to be relatively high, so that the above-mentioned residual fluorescence of the forgeries cannot lead to an exceeding of the threshold value. But the high threshold value can lead to the fact that the phosphorescence signal of heavily soiled authentic documents of value does not achieve the threshold value either and these are inadvertently sorted out.

SUMMARY

It is therefore a problem of the invention to provide a method for recognizing forged documents of value, with which, when checking the phosphorescence properties, those authentic documents of value, which show weak phosphorescence signals, are also recognized as authentic and are not inadvertently sorted out.

With the method according to the invention a document of value is illuminated with clocked excitation light of a light source, which is periodically switched on and off. Within a first time interval, during which the light source is switched on, a first luminescence intensity is detected from the document of value or from a partial area of the document of value and within a second time interval, during which the light source is switched off a second luminescence intensity. The first luminescence intensity is higher than the second luminescence intensity. The first luminescence intensity is exclusively detected within the first time interval, i.e. not within the second time interval, the second luminescence intensity is exclusively detected within the second time interval, i.e. not within the first time interval.

The first or second luminescence intensity is detected at one or a plurality of measuring times within the first or second time interval, which either is or are discrete or result from an averaging over a detection time frame. For determining a corrected second luminescence intensity, the second luminescence intensity is linked with the first luminescence intensity. The corrected second luminescence intensity substantially corresponds to a phosphorescence signal of the document of value or of a partial area of the document of value. For checking the document of value as to its phosphorescence properties, the corrected second luminescence intensity is compared with a threshold value. The exceeding of the threshold value can be used as an authenticity criterion for the document of value. The threshold value can be ascertained on the basis of a multiplicity of authentic and/or forged documents of value, in particular on the basis of a multiplicity of documents of value of the type of the document of value.

The light source preferably emits UV light and is operated, for example, with periodic current pulses, by which the light source is switched on and off. But the light emission of the light source follows the clocking of the current pulses a bit delayed, so that the light emission does not abruptly end with the end of the current pulse, but decays not until in the course of the second time interval, in which the light source is switched off. Such afterglowing of the light source leads to a remaining, but reduced optical excitation of the fluorescent substances of the document of value in the second time interval. With the method according to the invention a correction of the second luminescence intensity is carried out, so as to at least partially compensate the effects of the afterglow on the detected second luminescence intensity.

With the step of linking, the second luminescence intensity is corrected with the help of a scaled first luminescence intensity, for example the scaled first luminescence intensity being subtracted from the second luminescence intensity. The scaled first luminescence intensity results from scaling the first luminescence intensity with a scaling factor, the scaled first luminescence intensity being smaller than the first luminescence intensity. For scaling, the first luminescence intensity can be multiplied, for example, by a scaling factor smaller than 1.

The scaling factor can be determined with the help of an independent measurement of the light emission of the fluorescent substances, independent of the phosphorescence, e.g. on the basis of documents of value which only contain fluorescent substances but no phosphorescent substances. In the independent measurement the fluorescent substance is measured e.g. under measurement conditions identical with those of the method according to the invention. Here the fluorescence signal of the fluorescent substances is determined at the measuring times that are also used when checking the document of value, i.e. e.g. a first fluorescence intensity at the first measuring time and a second fluorescence intensity at the second measuring time. The relation of the second fluorescence intensities determined at the second measuring time of the independent measurement to the first fluorescence intensity of the first measuring time results in the scaling factor valid for these two measuring times. Alternatively, the scaling factor can also be calculated by the relation of the intensities of the excitation light to the measuring times used when checking the document of value. Since the fluorescence intensity at each measuring time is approximately proportional to the excitation intensity at the measuring time, as a scaling factor there can also be used the relation of the intensity of the excitation light at the second measuring time to the intensity of the excitation light at the first measuring time.

With a document of value or in a partial area of a document of value, which have fluorescent substances but no phosphorescent substances, the first luminescence intensity substantially is formed by a fluorescence signal of the document of value or of the partial area. The scaled first luminescence intensity in this case corresponds to a residual fluorescence of the document of value or of the partial area, which is excited by the afterglow of the light source. By linking the second luminescence intensity with the first luminescence intensity, the second luminescence intensity is substantially corrected by the residual fluorescence intensity of the respective partial area. Therefore, by the correction a fluorescence contribution to the second luminescence intensity, which results from the afterglow of the light source, is compensated. With documents of value or with partial areas of the document of value, which have fluorescent substances but no phosphorescent substances, the corrected second luminescence intensity will be approximatively zero. With these documents of value or partial areas the corrected second luminescence intensity therefore corresponds to the (approximatively imperceptible) phosphorescence signal of the document of value or of the partial area. Since the residual fluorescence depends on, for example, the concentration of the fluorescent substances in the respective partial area of the document of value, the correction of the second luminescence intensity is preferably carried out separately for each partial area of the document of value.

The correction of the second luminescence intensity is carried out for the purpose of compensating the residual fluorescence when a document of value or a partial area has fluorescent substances but no or hardly any phosphorescent substances. But since on checking a document of value it is not known whether the document of value to be checked has fluorescent substances or phosphorescent substances or both, the method according to the invention is also carried out for the documents of value or partial areas which have both substances or exclusively phosphorescent substances. With that in these cases, too, the correction of the second luminescence intensity is effected by the scaled first luminescence intensity. The corrected second luminescence intensity of the document of value or of the partial area having phosphorescent substances approximatively corresponds to the phosphorescence signal of the document of value or of the partial area. For the further evaluation the corrected second luminescence intensity is used as a phosphorescence signal, in particular for the comparison with the threshold value.

For checking the document of value, it is transported along a transport direction through a detection area of a sensor used for checking. Partial areas of the document of value disposed adjacent along the transport direction are checked timewise one after the other. The partial areas of the document of value, of which a first and a second luminescence intensity is detected, each correspond e.g. to an image point. Because the document of value is transported, the first and second luminescence intensity are not detected from exactly the same image point of the document of value, but they are approximatively associated to one single image point. The spatial distances of the image points along the transport direction are determined by the time intervals of the measuring times, at which the respective first and second luminescence intensity is detected. To obtain the same spatial resolution when increasing the transport speed of the document of value, a higher clock rate of the light source is required and the time interval of the measuring times and the position of the measuring times within the first and second time interval are to be adjusted respectively. On the other hand, a higher clock rate of the light source also leads to a shortening of the first and second time interval. Therefore, in case of a higher clock rate the second luminescence intensity must be detected in a shorter interval after the end of the previous excitation light pulse or after the end of the first time interval than in case of a lower clock rate. Therefore, with a higher clock rate, at the second measuring time there is a stronger afterglow of the light source and a greater residual fluorescence signal of the fluorescent substances excited therewith. Consequently, at a higher clock rate a greater scaling factor is used for calculating the residual fluorescence. Therefore, the scaling factor is determined for the respective measuring times and the respective clock rate of the light source and is used in dependence on the measuring times and the clock rate. The clock rate of the light source results from the desired transport speed and from the desired image point size or spatial resolution in transport direction.

Within the second time interval besides the second luminescence intensity for each image point there can also be detected one or a plurality of further luminescence intensities. By linking the further luminescence intensities with the first luminescence intensity further corrected luminescence intensities are determined. The first luminescence intensity and/or the second luminescence intensity and/or the further luminescence intensities each can be discrete measured values. But they each can also result from averaging a plurality of measured values, for example from averaging a plurality of discrete measured values or from a timewise integration over a detection time frame at the respective measuring time.

The method according to the invention can be carried out for one or a plurality of partial areas of the document of value. The corrected second luminescence intensity of each of the plurality of partial areas can be compared with an individual threshold value. From these comparisons an overall result can be calculated, which is used for testing the authenticity of the document of value. For determining the corrected second luminescence intensity of the plurality of partial areas, the first and the second luminescence intensity are determined e.g. each as a function of position on the document of value, there preferably being determined a two-dimensional distribution of each of the luminescence intensities, the first and the second luminescence intensity.

In an embodiment the checked partial area of the document of value contains a plurality of image points. In particular, the partial area is a region of interest (ROI) with a plurality of image points. In this case at first there are detected a first and a second luminescence intensity of each image point of the ROI. Then from the first and second luminescence intensity of all image points of the ROI precisely one average value of the first luminescence intensities and precisely one average value of the second luminescence intensities is determined. The average value of the first and the average value of the second luminescence intensity of the ROI are linked together for determining a corrected second luminescence intensity of the ROI. For this the average value of the first luminescence intensity is scaled with the scaling factor and subtracted from the average value of the second luminescence intensity. The result is precisely one corrected second luminescence intensity for the ROI, which is compared with a threshold value.

In a different embodiment the checked partial area exactly corresponds to an image point of the document of value, for each image point being determined a corrected second luminescence intensity. The image points can be distributed over the entire surface or also over one or a plurality of ROIs of the document of value.

The documents of value, which are checked with the method according to the invention, are, for example, bank notes. But, however, they can also be any other documents of value, the luminescence properties of which are to be checked. For carrying out the method according to the invention, there can be used an apparatus for checking documents of value, which has one or a plurality of sensors for checking the documents of value. The apparatus can be formed in particular for the identification and/or for the authenticity testing of the documents of value.

BRIEF DESCRIPTION OF THE DRAWINGS

In the following the invention is described by way of example with reference to the accompanying figures.

DETAILED DESCRIPTION OF THE PREFERRED EMBODIMENTS

Figure 1A:
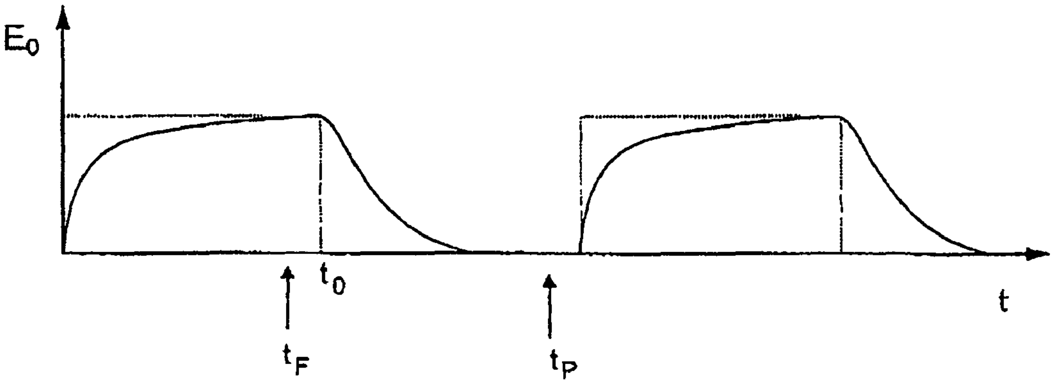
FIG. 1*a* shows clocked excitation intensity $E_0$ as a function of time t at a low clock rate.

FIG. 1*a* schematically shows the time course of the light intensity of a conventional UV lamp, which is used for the optical excitation of a document of value to be checked, e.g. a hot or cold cathode lamp. The UV lamp is part of a sensor for checking documents of value. In the case of FIG. 1*a* the excitation light $E_0$ of the UV lamp is clocked at a relatively low clock rate, for example 1 kilohertz. But the light pulses of the excitation light $E_0$ are no ideal rectangular pulses (by way of comparison drawn by dashed lines), but are delayed both on switching on and on switching off the UV lamp. Therefore, after the switch-off time to of the UV lamp there is an afterglow of the excitation light.

The excitation light leads to a periodic excitation of fluorescent substances and phosphorescent substances in the document of value to be checked. The time course of a fluorescence signal emitted by the fluorescent substances approximatively corresponds to the intensity course of the excitation light. The fluorescence signal of the document of value can be detected during the optical excitation, e.g. at the time $t_F$. Compared with the fluorescence signal, the phosphorescence signal of the document of value has a distinctly longer decay time. Therefore, in this example the phosphorescence signal of the document of value can be detected after the end of the excitation light pulse, e.g. at the time $t_P$, independent of the fluorescence signal.

Figure 1B:
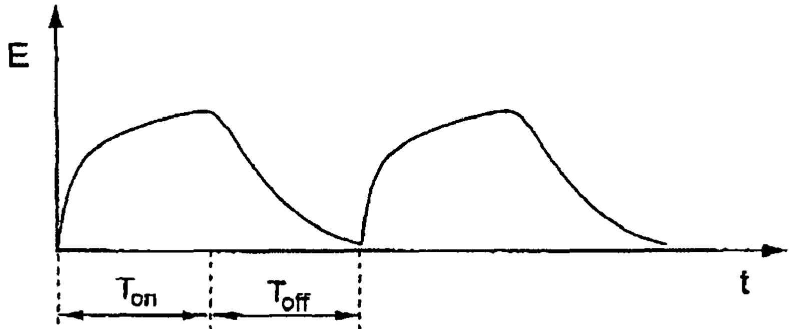
FIG. 1*b* shows clocked excitation intensity E as a function of time t at a higher clock rate.

FIG. 1*b* shows, by way of comparison, the light pulses of an excitation light E of the UV lamp, which has a higher clock rate than the excitation light $E_0$ of FIG. 1*a*. In contrast to the excitation light $E_0$ the excitation intensity of the excitation light E does not drop to zero again after switching off the UV lamp, i.e. in the time period $T_{off}$. During the time period $T_{off}$, too, there is effected an optical excitation of the fluorescent substances of the document of value, so that during the time period $T_{off}$, too, there is emitted a fluorescence signal F, cf. FIG. 1*c*. Therefore, at the time $t_2$, at which the phosphorescence signal is to be detected, there is a residual fluorescence $F_2$, which superposes the phosphorescence signal and distorts the phosphorescence signal measured at the time $t_2$. Therefore, in the time period $T_{off}$ there is detected a residual fluorescence signal in addition to the phosphorescence signal.

Figure 2A:
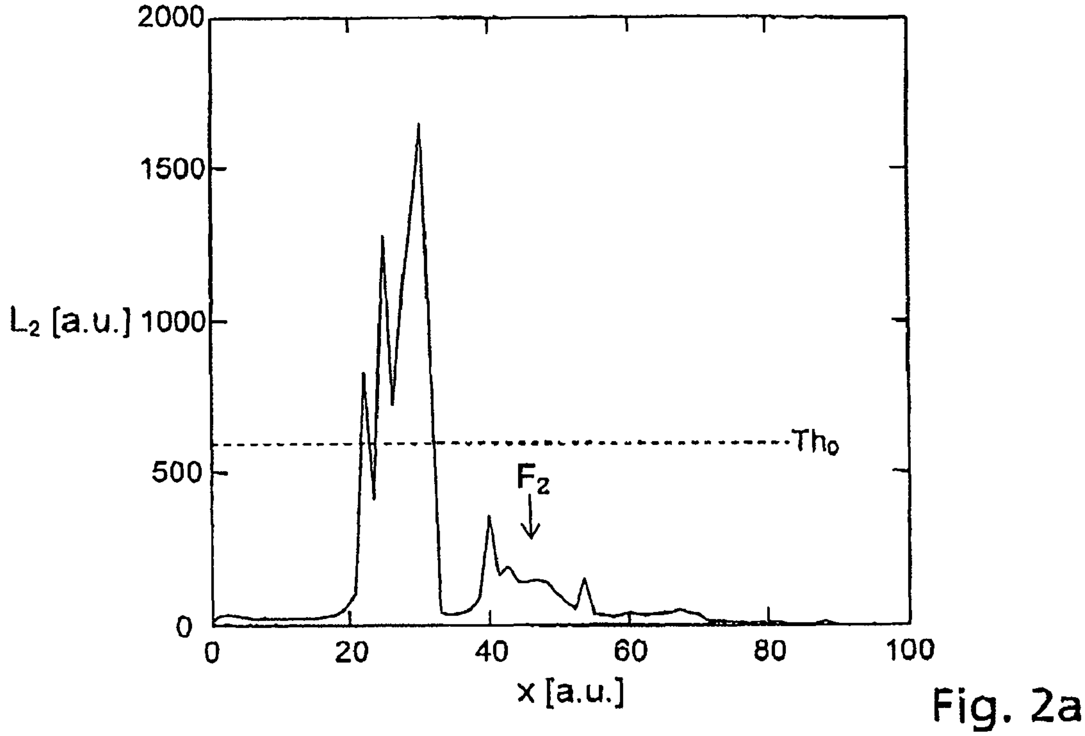
FIG. 2*a* shows one-dimensional spatial distribution of the second luminescence intensity $L_2$ detected at the second measuring time $t_2$.

In FIG. 2*a* is shown a spatial distribution of a luminescence intensity $L_2$ detected at the time $t_2$ as a function of position x on the document of value. Between x=20 and x=35 there lies a luminescence peak resulting from the phosphorescence signal of phosphorescent substances, which are present in this area of the document of value. Between x=40 and x=55 the detected luminescence intensity is formed by the residual fluorescence $F_2$ of the fluorescent substances, which are present in this area of the document of value. In the range between x=40 and x=55, however, the document of value has no phosphorescent substances. To be able to distinguish between documents of value with phosphorescent substances and without phosphorescent substances, with the previous method the measured luminescence intensity is compared with a threshold value $Th_0$, which lies between the maximum of the residual fluorescence signal $F_2$ and that of the phosphorescence signal. Because of the residual fluorescence signal $F_2$ the threshold value $Th_0$ has to be set relatively high.

Figure 2B:
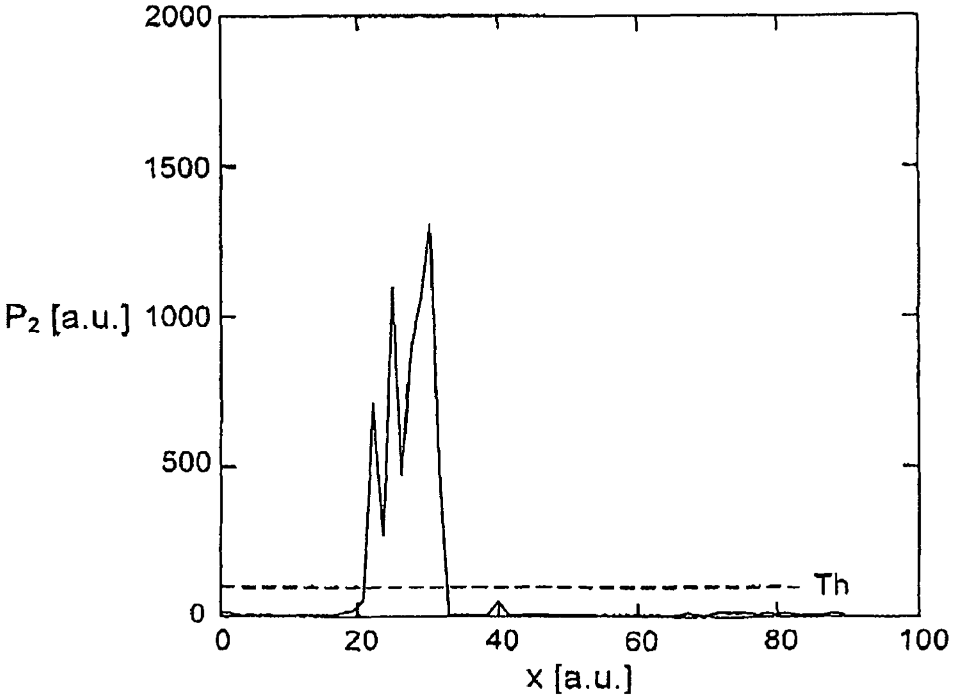
FIG. 2*b* shows one-dimensional spatial distribution of the corrected second luminescence intensity $P_2$.

In the method according to the invention the second luminescence intensity $L_2$ detected in the time period $t_{off}$ for example at the measuring time $t_2$, is corrected in that from $L_2$ is subtracted a portion of the first luminescence intensity detected at the first measuring time $t_1$. With that in the value document areas having the fluorescent substances, substantially, the residual fluorescence $F_2$ present at the measuring time $t_2$ is subtracted. At first, for each of the image points a scaled first luminescence intensity is calculated. To be independent of the changes of the excitation light in the course of the operating lifetime of the light source, the scaled first luminescence intensity is individually ascertained for each of the image points, namely by multiplying the first luminescence intensity $L_1$, which is detected at the measuring time $t_1$ from the image point, by a scaling factor S. The scaling factor S is characteristic for each of the chosen measuring times $t_1$ and $t_2$ and for the interval and the pulse shape of the light pulses of the excitation light. From the second luminescence intensity $L_2$ of each image point, by subtracting the scaled first luminescence intensity $S \cdot L_1$ of the image point there is ascertained a corrected second luminescence intensity $P_2$ of the image point, which at least approximatively corresponds to the phosphorescence signal of the image point, cf. FIG. 2*b*. In the example of FIG. 2*b* the subtraction is carried out for each image point individually.

The scaling factor S can be determined by an independent measurement of the fluorescent substances on the basis of documents of value which contain only fluorescent substances but no phosphorescent substances. With such independent measurement the fluorescence signal of the fluorescent substances is determined at the same measuring times that are used when checking the document of value, either at the discrete measuring times $t_1$, $t_2$ or also the time course of the fluorescence drop, cf. FIG. 1*c*. The scaling factor S valid for the two measuring times $t_1$, $t_2$ can be determined from the relation of the fluorescence intensity at the second measuring time $t_2$ determined at the independent measurement to the fluorescence intensity at the first measuring time $t_1$. Alternatively, the scaling factor can also be determined by dividing the intensity of the excitation light at the second measuring time $t_2$ (afterglow of the light source) by the intensity of the excitation light at the first measuring time $ti_1$.

For determining a spatial distribution of the corrected second luminescence intensity $P_2$, for each of the partial areas of the document of value to be checked the scaled second luminescence intensity $S \cdot L_1(x, y)$ is calculated as a function of position x, y of the partial area on the document of value. In the areas of the fluorescent substances the scaled second luminescence intensity $S \cdot L_1(x, y)$ corresponds to the residual fluorescence intensity $F_2$ present at the second measuring time $t_2$. The second luminescence intensity $L_2(x, y)$ is lined with $S \cdot L_1(x, y)$, for determining the corrected second luminescence intensity.

$$P_2(x, y)=L_2(x, y)-S \cdot L_1(x, y),$$

which at least approximatively corresponds to the phosphorescence signal at the second measuring time $t_2$.

In FIG. 2*b* is shown the spatial distribution of the corrected second luminescence intensity $P_2$, which was determined in this way from the second luminescence intensity $L_2$ of FIG. 2*a*. The residual fluorescence signal $F_2$ between x=40 and x=55 has been eliminated by the method according to the invention. Compared to the original threshold value $Th_0$ now a distinctly lower threshold value Th can be used, with which the corrected second luminescence intensity $P_2$ is compared, to check the examined documents of value as to their phosphorescence properties. By comparing the corrected second luminescence intensity with the lower threshold value Th, there even can be reliably determined the authenticity of those used documents of value the phosphorescence of which is reduced because of soiling.

Figure 1C:
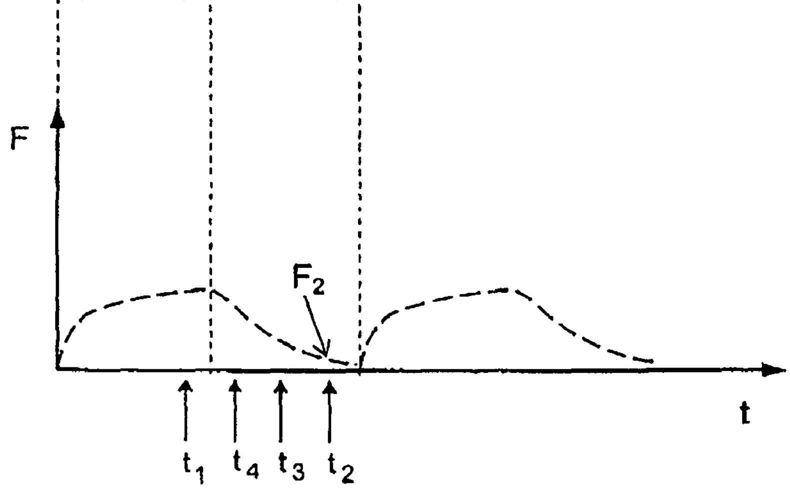
FIG. 1*c* shows sketched course of fluorescence intensity F as a function of time t at the higher clock rate.

In addition to the detection of the second luminescence intensity $L_2$, there can also be detected luminescence intensities at further points in time within the time period $T_{off}$, e.g. a third luminescence intensity $L_3$ at the time $t_3$, a fourth luminescence intensity $L_4$ at the time $t_4$, etc, cf. FIG. 1*c*. For each of the measuring times $t_3$, $t_4$ is determined a scaling factor valid for this measuring time. From the further luminescence intensities $L_3$, $L_4$ there are ascertained further corrected luminescence intensities $P_3$, $P_4$ with the help of the method according to the invention. From the time course of the corrected luminescence intensities $P_2$, $P_3$, $P_4$ there can be determined the decay behavior of the phosphorescence intensity of one or a plurality of phosphorescent substances which are provided in the document of value to be checked. The decay behavior can be compared with reference data and used for the identification of one or also a plurality of phosphorescent substances and/or for testing the authenticity of the documents of value.

Instead of detecting discrete luminescence intensities $L_1$ or $L_2$, $L_3$, $L_4$ at individual measuring times, the luminescence intensities can also be detected by timewise integration, e.g. over a time segment within the time period $T_{on}$ or $T_{off}$ or over the entire time period $T_{on}$ or $T_{off}$. Then, for correcting the integrated luminescence intensity $L_2$, $L_3$, $L_4$ for each individual integrated detection time frame a scaling factor is determined.

Figure 3A:
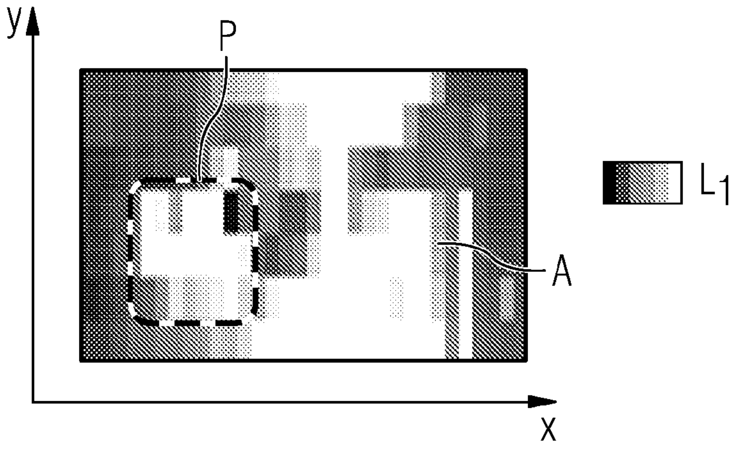
FIG. 3*a* shows two-dimensional spatial distribution of the first luminescence intensity $L_1$ detected at the first measuring time $t_1$.

In FIG. 3*a* by way of example is shown a two-dimensional spatial distribution of the first luminescence intensity $L_1$, which was detected at a first measuring time $t_1$ within the time period $T_{on}$. The luminescence intensity of the image points, e.g. of image point A, is represented by shades of gray, high luminescence intensities being shown brightly. In the left partial picture of FIG. 3*a* is marked a phosphorescence area P of the document of value, in which phosphorescent substances are provided and which forms an ROI. The document of value, in addition, has fluorescent substances which show a clear fluorescence signal, in particular outside the phosphorescence area P.

Figure 3B:
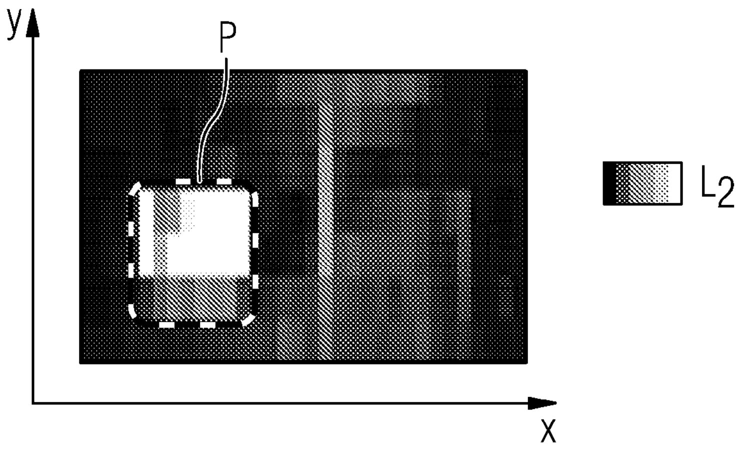
FIG. 3*b* shows two-dimensional spatial distribution of the second luminescence intensity $L_2$ detected at the second measuring time $t_2$.
Figure 3C:
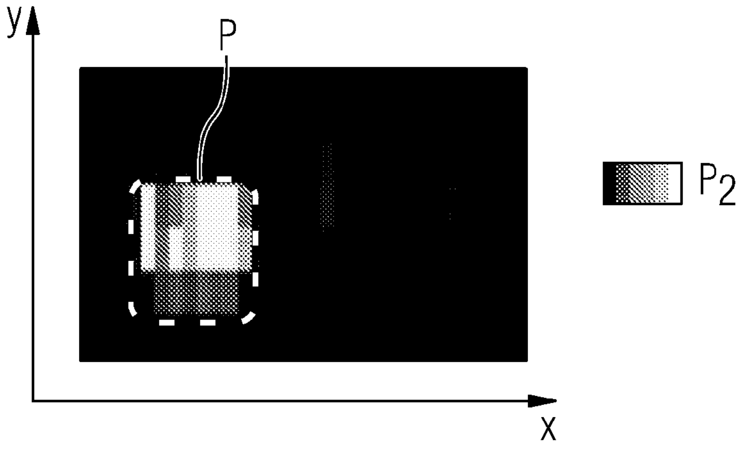
FIG. 3*c* shows two-dimensional spatial distribution of the corrected second luminescence intensity $P_2$ determined from the first $L_1$ and from the second luminescence intensity $L_2$.

FIG. 3*b* shows a two-dimensional spatial distribution of the second luminescence intensity $L_2$, which was detected at a measuring time $t_2$ within the time period $T_{off}$. In the marked area P the light emission of the phosphorescent substances provided there leads to a clear luminescence signal. In the remaining areas of the document of value the luminescence intensity first of all results from the residual fluorescence $F_2$ of the fluorescent substances. For correcting, for each image point, from the second luminescence intensity $L_2$ of FIG. 3*b* is subtracted the scaled first luminescence intensity $S \cdot L_1$, for scaling the scaling factor S valid for the measuring times $t_1$, $t_2$ being used. Alternatively, for the marked phosphorescence area P there can also be determined the average values of the first luminescence intensity and the second luminescence intensity and therefrom, with the help of the scaling factor S, a corrected second luminescence intensity of the phosphorescence area P can be calculated. The scaling factor in the shown example is about 15%. From the first luminescence intensity $L_1$ and from the second luminescence intensity $L_2$ there results the corrected second luminescence intensity $P_2$ represented in FIG. 3*c*. The luminescence intensity detected outside the phosphorescence area P thus is largely eliminated.

The invention claimed is:

1. A method for checking documents of value comprising the steps:

illuminating a document of value with clocked excitation light (E) of at least one light source, said light being switched on for at least one first time interval ($T_{on}$) and being switched off for at least one second time interval ($T_{off}$), detecting a first luminescence intensity ($L_1$) within the first time interval ($T_{on}$), detecting a second luminescence intensity ($L_2$) within the second time interval ($T_{off}$), linking the second luminescence intensity ($L_2$) with the first luminescence intensity ($L_1$) and determining a corrected second luminescence intensity ($P_2$) of the document of value or a partial area (A, P) of the document of value, wherein the corrected second luminescence intensity ($P_2$) substantially corresponds to a phosphorescence signal of the document of value or of the partial area (A, P) of the document of value.

2. The method according to claim 1, wherein the corrected second luminescence intensity ($P_2$) substantially corresponds to a phosphorescence signal of the document of value or of the partial area (A, P) of the document of value.

3. The method according to claim 1, wherein the corrected second luminescence intensity ($P_2$) is compared with a threshold value (Th).

4. The method according to claim 1, wherein, upon linking, the second luminescence intensity ($L_2$) is corrected using a scaled first luminescence intensity.

5. The method according to claim 4, wherein the scaled first luminescence intensity is calculated by scaling the first luminescence intensity ($L_1$) with a scaling factor (S), the scaled first luminescence intensity being smaller than the first luminescence intensity ($L_1$).

6. The method according to claim 5, wherein the scaling factor (S) is determined in dependence on at least one of a clock rate of the light source and measuring times ($t_1$, $t_2$), at which the first and the second luminescence intensity are detected.

7. The method according to claim 1, wherein, upon linking, the second luminescence intensity ($L_2$) is corrected substantially by a residual fluorescence intensity ($F_2$) of the document of value or of the partial area (A, P) of the document of value present in the second time interval ($T_{off}$).

8. The method according to claim 1, wherein within the second time interval ($T_{off}$) at least one further luminescence intensity ($L_3$, $L_4$) is detected.

9. The method according to claim 8, wherein, for determining at least one further corrected luminescence intensity ($P_3$, $P_4$), the at least one further luminescence intensity ($L_3$, $L_4$) is linked with the first luminescence intensity ($L_1$).

10. The method according to claim 1, wherein, at least one of the first luminescence intensity ($L_1$), the second luminescence intensity ($L_2$) and the at least one further luminescence intensity ($L_3$, $L_4$) is a discrete measured value.

11. The method according to claim 1, wherein, at least one of the first luminescence intensity ($L_1$), the second luminescence intensity ($L_2$) and the at least one further luminescence intensity ($L_3$, $L_4$) results from averaging a plurality of measured values.

12. The method according to claim 1, wherein the method is carried out for one or a plurality of partial areas (A, P) of the document of value, each of the partial areas (A, P) corresponding in particular to an image point (A) or an ROI (P) of the document of value.

13. The method according to claim 12, wherein the first luminescence intensity ($L_1$) and the second luminescence intensity ($L_2$) are detected as function of position (x, y) of the partial areas (A, P) on the document of value.

* * * * *